(12) United States Patent
Tyrberg et al.

(10) Patent No.: US 12,537,115 B2
(45) Date of Patent: Jan. 27, 2026

(54) TREFOIL SUBMARINE POWER CABLE BUNDLE

(71) Applicant: NKT HV Cables AB, Lyckeby (SE)

(72) Inventors: Andreas Tyrberg, Lyckeby (SE); Håkan Sandell, Karlskrona (SE); Denny Tjahjanto, Sundbyberg (SE)

(73) Assignee: NKT HV Cables AB, Lyckeby (SE)

( * ) Notice: Subject to any disclaimer, the term of this patent is extended or adjusted under 35 U.S.C. 154(b) by 250 days.

(21) Appl. No.: 18/463,478

(22) Filed: Sep. 8, 2023

(65) Prior Publication Data

US 2024/0087770 A1 Mar. 14, 2024

(30) Foreign Application Priority Data

Sep. 13, 2022 (EP) .................................. 22195300

(51) Int. Cl.
*H01B 7/14* (2006.01)
*H01B 11/22* (2006.01)
*H02G 1/10* (2006.01)
*H02G 9/02* (2006.01)

(52) U.S. Cl.
CPC ............. *H01B 7/14* (2013.01); *H01B 11/22* (2013.01); *H02G 1/10* (2013.01); *H02G 9/02* (2013.01)

(58) Field of Classification Search
CPC . H01B 7/14; H01B 11/22; H02G 1/10; H02G 9/02
USPC ........................................................ 174/68.1
See application file for complete search history.

(56) References Cited

U.S. PATENT DOCUMENTS

2016/0276066 A1\* 9/2016 Perego ..................... H01B 9/02

FOREIGN PATENT DOCUMENTS

| EP | 3072193 A1 | 9/2016 |
| FR | 2180630 A1 | 11/1973 |
| IE | 912988 A1 | 2/1992 |
| WO | 2015074696 A1 | 5/2015 |

OTHER PUBLICATIONS

Extended European Search Report; Application No. 22195300.3; Completed: Feb. 15, 2023; Mailed: Feb. 23, 2023; 8 Pages.

\* cited by examiner

*Primary Examiner* — Timothy J Thompson
*Assistant Examiner* — Michael F Mcallister
(74) *Attorney, Agent, or Firm* — Whitmyer IP Group LLC

(57) ABSTRACT

A submarine power cable bundle including: a first bottom direct current, DC, submarine power cable, a second bottom DC submarine power cable, and a top DC submarine power cable, wherein the first bottom DC submarine power cable and the second bottom DC submarine power cable are bundled together by means of a first elongated bundling element, forming a first bundle, wherein the first bundle is bundled together with the top DC submarine power cable by means of a second elongated bundling element, forming a trefoil configuration, wherein the first elongated bundling element bundles the first bundle tighter than the second elongated bundling element bundles the first bundle and the top DC submarine power cable.

20 Claims, 2 Drawing Sheets

TREFOIL SUBMARINE POWER CABLE BUNDLE

TECHNICAL FIELD

The present disclosure generally relates to submarine power cables.

BACKGROUND

Submarine cables are installed from marine vessels, such as cable laying ships or barges. Often, the submarine cables are fed from a drum or turntable to the seabed via a curved chute arranged on the vessel. The submarine cables are thus bent as they lay on the chute. The submarine cables are bent in the generally opposite direction to that on the chute when touching down on the seabed.

Some cable systems may include three direct current (DC) submarine power cables connecting two points of a power generation system. One for the plus pole, one for the minus pole, and one power cable for redundancy purposes. Such cable systems may also comprise a submarine fibre optic cable running externally along the length of the submarine power cables.

It is beneficial if all submarine cables connecting two points can be installed at the same time because it saves installation time, which reduces the risks of changing weather conditions at sea and costs that follow. Common installation of all cables can be done by bundling all submarine cables and lowering them into the water together.

It is problematic to lower the cables if they are arranged in a flat configuration, i.e., arranged beside each other in one plane, because it is difficult to maintain the cables stable. The centre cable will want to move out of line with the others, risking damaging the fibre optic cable. In a trefoil configuration, with one power cable on top of the other power cables, the bundle will be bent over the chute and at the touchdown point. This leads to a mismatch in length of the power cables. The inner power cable(s) with respect to the curve formed by the bundle, is/are compressed and the outer(s) is/are elongated. With a tight bundle, this leads to large compressive and tensile forces in the individual cables in the bundle.

SUMMARY

In view of the above an object of the present disclosure is to provide a submarine power cable bundle which solves or at least mitigates the problems of the prior art.

There is hence according to a first aspect of the present disclosure provided a submarine power cable bundle comprising: a first bottom direct current, DC, submarine power cable, a second bottom DC submarine power cable, and a top DC submarine power cable, wherein the first bottom DC submarine power cable and the second bottom DC submarine power cable are bundled together by means of a first elongated bundling element, forming a first bundle, wherein the first bundle is bundled together with the top DC submarine power cable by means of a second elongated bundling element, forming a trefoil configuration, wherein the first elongated bundling element bundles the first bundle tighter than the second elongated bundling element bundles the first bundle and the top DC submarine power cable.

The inventors have found that the trefoil configuration is the best bundling method. In order to control the loads onto the cables it was also found that the top DC submarine power cable should be able to slide axially in relation to the two bottom DC submarine power cables as it passes over the vessel chute, through the water column and lands on the seabed. This ensures that the mismatch in cable length when being bent over a vessel chute is compensated by the opposite mismatch in length at the bend at the touchdown point.

To ensure the sliding, the second elongated bundling element around all three DC submarine power cables should be sufficiently loose to allow the top DC submarine power cable to slide axially. Further, to ensure stability, and not risking damaging any submarine fibre optic cable in the bundle, the first elongated bundling element should be tight enough to avoid that the e top DC submarine power cable is squeezed in between the two bottom DC submarine power cables and thus that the trefoil shape becomes a flat configuration during bending. Moreover, if the first bundle and the top DC submarine power cable are held too tight by the second elongate bundling element, large forces will accumulate in the elongated bundling elements either leading to failure of the elongated bundling elements or excessive compressive force onto the top DC submarine power cable at the touchdown point.

According to one embodiment the first bundle is bundled with a tightness that prevents the top DC submarine power cable to fully slide in between and align with the first bottom DC submarine power cable and the second bottom DC submarine power cable, and wherein the second elongated bundling element bundles the first bundle and the top DC submarine power cable with a tightness that enables axial movement of the top DC submarine power cable relative to the first bundle when the submarine power cable bundle is laid on the seabed via a vessel chute.

The first elongated bundling element may be pre-tensioned with at most 50 kg, such as at most 40 kg.

The second elongated bundling element may be pre-tensioned with at most 50 kg, such as at most 40 kg.

According to one embodiment the first elongated bundling element bundles the first bottom DC submarine power cable and the second bottom DC submarine power cable along a majority of the length of the first bottom DC submarine power cable and the second bottom DC submarine power cable.

According to one embodiment the second elongated bundling element bundles the first bundle and the top DC submarine power cable along a majority of the length of the first bottom DC submarine power cable, the second bottom DC submarine power cable, and the top DC submarine power cable.

According to one embodiment the trefoil configuration has an outer bundle circumference which is defined by a length of the second elongated bundling element as it extends one turn around the first bundle and the top DC submarine power cable, seen in a cross-sectional view along a longitudinal axis of the submarine power cable bundle, wherein a first lay length of the first elongated bundling element is at most 3 times the outer bundle circumference, such as at most 2.5 times the outer bundle circumference.

The outer bundle circumference is thus the length of the boundary around the top DC submarine power cable, the first bottom DC submarine power cable, and the second bottom DC submarine power cable, formed by the second elongated bundling element as seen in a cross-sectional view of the submarine power cable bundle.

According to one embodiment a second lay length of the second elongated bundling element is at most 9 times the outer bundle circumference, such as at most 3.75 times the outer bundle circumference.

The second lay length may thus be 1.5-3.6 times the first lay length, for example 1.8-3 times the first lay length.

According to one embodiment the first elongated bundling element has a tensile stiffness of at most 15 kN, 12 kN, or 10 kN.

The "tensile stiffness" is a measure of the amount of tensile force per unit of elongation of the first/second elongated bundling element, where the elongation is defined as the change in length normalized by the initial length.

According to one embodiment a ratio between the number N of first elongated bundling elements used times the tensile stiffness of a first elongated bundling element and the first lay length is at least 4 kN/m.

According to one embodiment the second elongated bundling element has a tensile stiffness of at most 15 kN, 12 kN, or 10 kN.

According to one embodiment a ratio between number M of second elongated bundling elements used times the the tensile stiffness of a second elongated bundling element and the second lay length is at least 2 kN/m and at most 10 kN/m.

According to one embodiment the first elongated bundling element is arranged in an 8-shaped formation as it bundles the first bottom DC submarine power cable and the second bottom DC submarine power cable.

One embodiment comprises a submarine fibre optic cable, wherein the submarine fibre optic cable is bundled with the first bundle by means of the second elongated bundling element or forms part of the first bundle.

According to one embodiment the first elongated bundling element is a rope or yarn and wherein the second elongated bundling element is a rope or yarn.

According to one embodiment the first elongated bundling element is laid with a first lay direction and the second elongated bundling element is laid with a second lay direction, opposite to the first lay direction.

There is according to a second aspect of the present disclosure provided a method of laying DC submarine power cables from a marine vessel, the method comprising: a) providing a first bottom DC submarine power cable, a second bottom DC submarine power cable, and a top DC submarine power cable, b) bundling the first bottom DC submarine power cable with the second bottom DC submarine power cable by means of a first elongated bundling element, to form a first bundle, c) bundling the first bundle with the top DC submarine power cable by means of a second elongated bundling element, to form a submarine power cable bundle with a trefoil configuration, wherein the bundling in step b) is made tighter than the bundling in step c), and d) laying the submarine power cable bundle on the seabed from the marine vessel.

One example comprises controlling a feed-out speed of the first bottom DC submarine power cable, the second bottom DC submarine power cable, and the top DC submarine power cable from a respective drum or turntable into the water to be the same during steps b)-d).

Generally, all terms used in the claims are to be interpreted according to their ordinary meaning in the technical field, unless explicitly defined otherwise herein. All references to "a/an/the element, apparatus, component, means", etc. are to be interpreted openly as referring to at least one instance of the element, apparatus, component, means, etc., unless explicitly stated otherwise.

BRIEF DESCRIPTION OF THE DRAWINGS

The specific embodiments of the inventive concept will now be described, by way of example, with reference to the accompanying drawings, in which.

DETAILED DESCRIPTION

The inventive concept will now be described more fully hereinafter with reference to the accompanying drawings, in which exemplifying embodiments are shown. The inventive concept may, however, be embodied in many different forms and should not be construed as limited to the embodiments set forth herein; rather, these embodiments are provided by way of example so that this disclosure will be thorough and complete, and will fully convey the scope of the inventive concept to those skilled in the art. Like numbers refer to like elements throughout the description.

Figure 1:
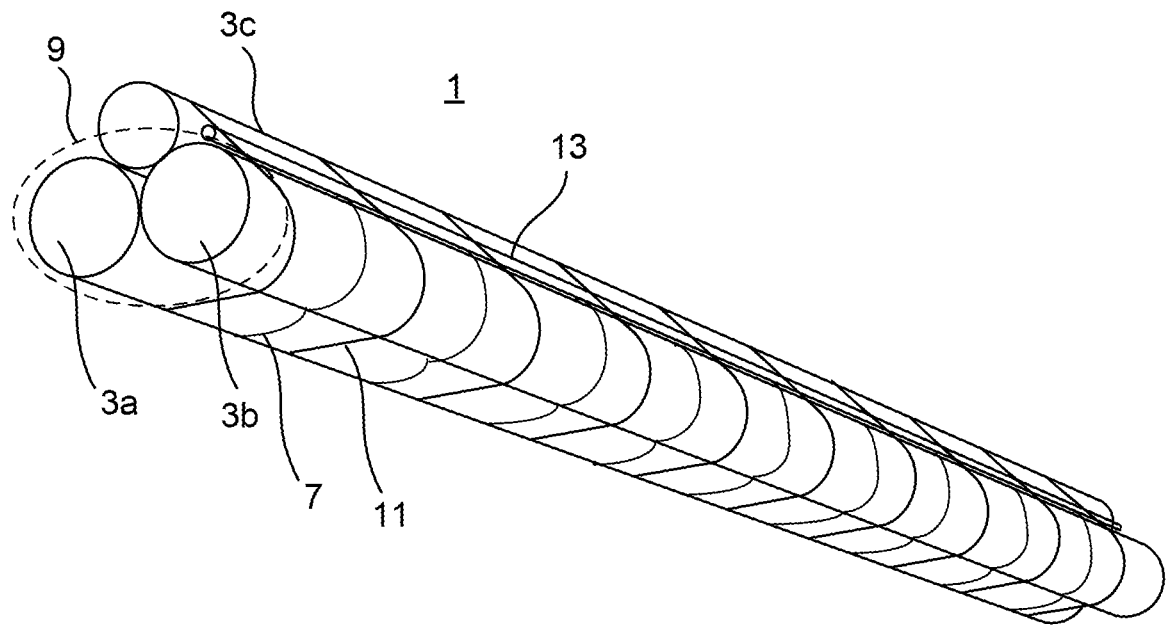
FIG. 1 schematically shows a perspective view of an example of a submarine power cable bundle.

FIG. 1 shows an example of a submarine power cable bundle 1.

The submarine power cable bundle 1 may be configured for medium voltage or high voltage operation.

The submarine power cable bundle 1 comprises a first bottom DC submarine power cable 3a, a second bottom DC submarine power cable 3b, and a top DC submarine power cable 3c.

The first bottom DC submarine power cable 3a, the second bottom DC submarine power cable 3b, and the top DC submarine power cable 3c are arranged in a trefoil configuration. The top DC submarine power cable 3c is arranged on top of the first and the second bottom DC submarine power cables 3a and 3b. The first bottom DC submarine power cable 3a, the second bottom DC submarine power cable 3b, and the top DC submarine power cable 3c are arranged parallel, or essentially parallel, with each other along the length of the submarine power cable bundle 1. The three DC submarine power cables 3a-3c are thus not stranded or twisted in the trefoil configuration bundle.

Each of the first bottom DC submarine power cable 3a and the second bottom DC submarine power cable 3b comprises a respective conductor, insulation system arranged around the conductor, optionally an armour layer e.g., comprising elongated armour elements laid helically around the insulation system, and an outer sheath or serving which forms the outermost layer of the respective DC submarine power cable 3a, 3b. These interior components are for simplicity not shown in the figures. Each insulation system comprises an inner semiconducting layer, an insulation layer arranged radially outside the inner semiconducting layer, and an outer semiconducting layer arranged radially outside the insulation layer.

At least two of the first bottom DC submarine power cable 3a, the second bottom DC submarine power cable 3b, and the top DC submarine power cable 3c are designed for the same voltage and current rating. Preferably all three DC submarine power cables 3a-3c are designed for the same voltage and current rating.

The top DC submarine power cable 3c may according to one example have a smaller outer diameter than that of the first bottom DC submarine power cable 3a and that of the second bottom DC submarine power cable 3b. Alternatively, all three cables 3a, 3b, and 3c may have the same outer diameter.

The first bottom DC submarine power cable 3a may for example be a plus pole and the second bottom DC submarine power cable 3b may for example be a minus pole. The top DC submarine power cable 3c may be a redundant cable or return cable, for use in case of failure in one of the first and the second bottom DC submarine power cables 3a and 3b.

The submarine power cable bundle 1 comprises one or more first elongated bundling elements 7. Each first elongated bundling element 7 may for example be a yarn, such as a polymer yarn, or a rope, such as a polymer rope.

The first elongated bundling element 7 may have a tensile stiffness of at most 15 kN, 12 kN, or 10 kN.

The first bottom DC submarine power cable 3a and the second bottom DC submarine power cable 3b are bundled together by means of the one or more first elongated bundling elements 7 and thus form a first bundle 9.

The first bottom DC submarine power cable 3a and the second bottom DC submarine power cable 3b may be in direct contact with each other along a majority of or all of the length of the submarine power cable bundle 1.

The submarine power cable bundle 1 comprises one or more second elongated bundling elements 11. Each second elongated bundling element 11 may for example be a yarn, such as a polymer yarn, or a rope, such as a polymer rope.

The second elongated bundling element 11 may have a tensile stiffness of at most 15 kN, 12 kN, or 10 kN.

The top DC submarine power cable 3c is bundled with the first bundle 9 by means of the one or more second elongated bundling element 11.

The top DC submarine power cable 3c is arranged partly in the space, or interstice, between the first and the second bottom DC submarine power cables 3a, 3b formed by a portion of their curved outer perimeter surfaces that meet. The three DC submarine power cables 3a-3c are thus arranged in a trefoil configuration.

The weight of the top DC submarine power cable 3c may cause downward deflection or deformation of the first elongated bundling element 7. The first elongated bundling element 7 is however preferably arranged so tightly around the first bundle 9 that the top DC submarine power cable 3c is unable to move in completely between the first bottom DC submarine power cable 3a and the second bottom DC submarine power cables 3b such that the three cables 3a-3c form a flat configuration. Thus, the first elongated bundling element 7 bundles the first bottom DC submarine power cable 3a and the second bottom DC submarine power cable 3b so tight that it prevents the top DC submarine power cable 3c to fully slide in between and align with the first bottom DC submarine power cable 3a and the second bottom DC submarine power cable 3b.

The second elongated bundling element 11 holds the first bottom DC submarine power 3a, the second bottom DC submarine power cable 3b, and the top DC submarine power cable 3c less tightly than the first elongated bundling element 7 holds the first bottom DC submarine power 3a and the second bottom DC submarine power cable 3b. The second elongated bundling element 11 bundles the first bundle 9 and the top DC submarine power cable 3c with a tightness that enables axial movement of the top DC submarine power cable 3c relative to the first bundle 9 when the submarine power cable bundle 1 is suspended into water via a vessel chute and has landed on the seabed.

The submarine power cable bundle 1 may comprise a submarine fibre optic cable 13. The submarine fibre optic cable 13 comprises optical fibres and a tube in which the optical fibres are arranged. Further, the submarine fibre optic cable 13 may optionally comprise an armour layer, or several armour layers, formed by helically laid elongated armour elements.

The submarine fibre optic cable 13 may be attached to the first bundle 9 by means of the second elongated bundling element 11. In this case, the submarine fibre optic cable 13 may be arranged in an interstice between the top DC submarine power cable 3b and one of the two bottom submarine DC power cables 3a or 3b. Alternatively, the submarine fibre optic cable 13 may form part of the first bundle 9 and is in this case bundled using the first elongated bundling element 7. In this case, the submarine fibre optic cable 13 may be arranged in the centre of the trefoil configuration, in between all three DC submarine power cables 3a-3c but within the first bundle 9, or in an interstice between the two bottom DC submarine power cables 3a and 3b, on the underside of the trefoil configuration, as shown by the dashed circles in FIG. 3. In general, the selection of location of the submarine fibre optic cable 13 depends on the size of the DC submarine power cables 3a-3c and on how the submarine power cable bundle 1 will be buried on the seabed.

Figure 2:
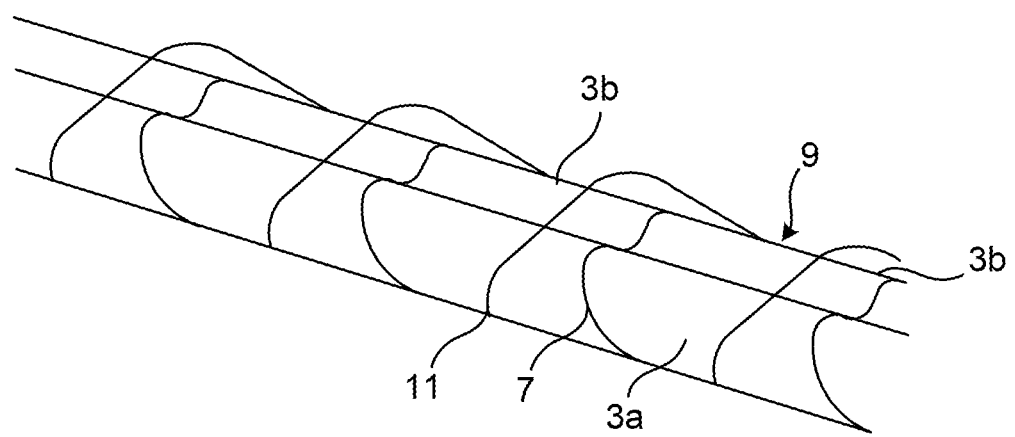
FIG. 2 schematically shows a perspective view of the submarine power cable bundle with a top DC submarine power cable removed to show a second elongated bundling element holding a first bundle.

FIG. 2 depicts the submarine power cable bundle 1 with the top DC submarine power cable 3c removed to show the first elongated bundling element 7 as it is arranged underneath the top DC submarine power cable 3c.

The first elongated bundling element 7 is according to the example arranged in a 0-shaped configuration before the top DC submarine power cable 3c is placed on the first bundle 9. The weight of the top DC submarine power cable 3c causes the inwards deflection of the first elongated bundling element 7 thus deforming the 0-shape.

As an alternative to the deformed 0-shaped configuration of the first elongated bundling element 7, the first elongated bundling element 7 may be laid with an 8-shape formation around the first bottom DC submarine power cable 3a and the second bottom DC submarine power cable 3b. In this case, in each 8-shaped loop, the first elongated bundling element 7 crosses between the first bottom DC submarine power cable 3a and the second bottom DC submarine power cable twice.

Figure 3:
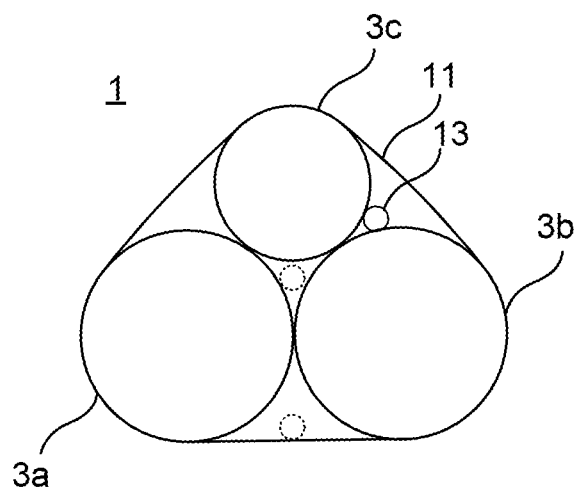
FIG. 3 shows a cross-sectional view of the submarine power cable bundle in FIG. 1.

FIG. 3 shows a cross-section of the submarine power cable bundle 1 along a longitudinal axis of the submarine power cable bundle 1. A full turn of the second elongated bundling element 11 around the first bottom DC submarine power cable 3a, the second bottom DC submarine power cable 3b, and the top DC submarine power cable 3c can be seen in the cross-section. The length of one turn of the second elongated bundling element 11 as seen in the cross-section, is herein referred to as an outer bundle circumference of the trefoil configuration of the submarine power cable bundle 1. One such turn has a generally triangular shape with rounded edges defined by arc lengths of the three DC submarine power cables 3a-3c where the second elongated bundling element 11 contacts the DC submarine power cabled 3a-3c.

A first lay length of the first elongated bundling element 7 is the length along the axial direction of the submarine power cable bundle 1 between two points of the first elongated bundling element 7 where its laying pattern is repeated.

The first lay length of the first elongated bundling element 7 may according to one example be at most 3 times the outer bundle circumference, such as at most 2.5 times the outer bundle circumference.

A second lay length of the second elongated bundling element 11 is the length along the axial direction of the submarine power cable bundle 1 between two points of the second elongated bundling element 11 where its laying pattern is repeated.

The first lay length and the second lay length may be the same. Alternatively, the first lay length and the second lay length may differ. For example, the second lay length may be 1.5-4 times the first lay length, such as 1.8-3 times the first lay length.

The first elongated bundling element 7 may be laid with a first lay direction. The second elongated bundling element 11 may be laid with a second lay direction, opposite to the first lay direction. Alternatively, the first elongated bundling element 7 and the second elongated bundling element 11 may be laid with the same lay direction.

A ratio R1 between the number N of first elongated bundling elements 7 used times the tensile stiffness of one first elongated bundling element 7 and the first lay length may be at least 4 kN/m. Thus $$R1 = \frac{N * \text{axial stiffness of first elongated bundling element}}{\text{first lay length}} \geq 4 \text{ kN/m}$$

The second lay length of the second elongated bundling element 11 may according to one example be at most 9 times the outer bundle circumference, such as at most 3.75 times the outer bundle circumference.

A ratio R2 between the number M of second elongated elements 11 used times the tensile stiffness of one second elongated bundling element 11 and the second lay length may be at least 2 kN/m. Thus $$R2 = \frac{M * \text{axial stiffness of second elongated bundling element}}{\text{second lay length}} \geq 2 \text{ kN/m}$$

The ratio R2 may according to one example be at most 10 kN/m.

Figure 4:
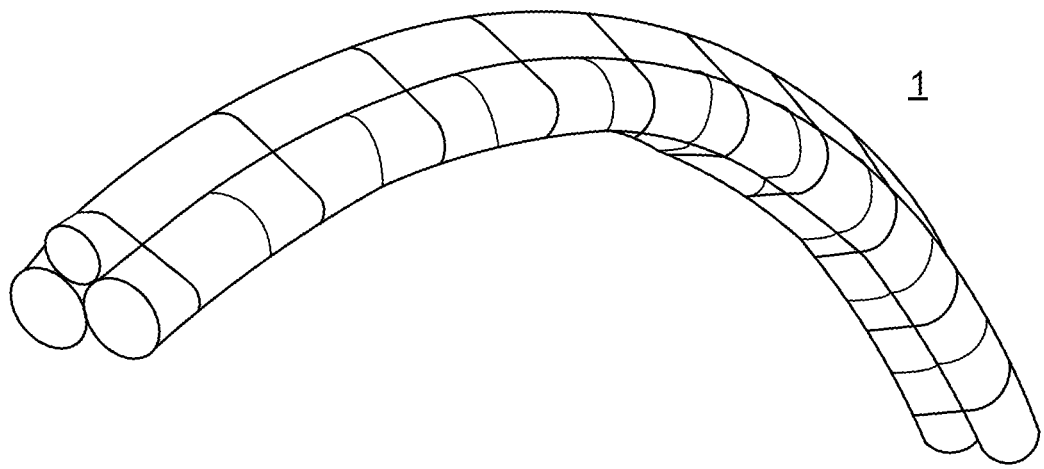
FIG. 4 shows the submarine power cable in FIG. 1 in a bent state.
Figure 5:
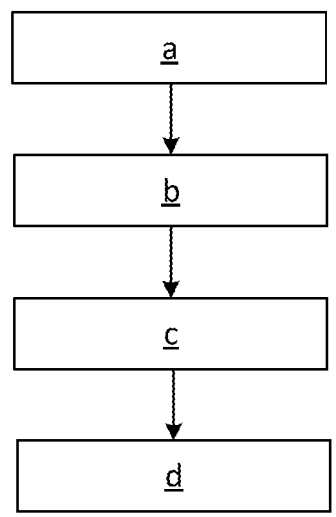
FIG. 5 is a flowchart of a method of laying a submarine power cables from a marine vessel.

With reference to FIGS. 4 and 5 a method of laying DC submarine power cables as a submarine power cable bundle from a marine vessel will be described.

FIG. 5 shows the submarine power cable bundle 1 in a bent state, for example on a vessel chute, when being suspended from a marine vessel into water to the seabed. The submarine power cable bundle 1 is bent in a similar manner, although in the opposite direction, when the submarine power cable bundle 1 touches down on the seabed.

The vessel chute is typically the final component of a marine vessel that submarine power cables have contact with before being submerged by water. The vessel chute causes a gradual change of the orientation of the submarine power cables from the generally horizontal position on the marine vessel to a generally vertical position in the water.

The submarine power cable bundle 1 is formed on the marine vessel during cable laying operations. Each of the first bottom DC submarine power cable 3*a*, the second bottom DC submarine power cable 3*b*, and the top DC submarine power cable 3*c* may initially be arranged on a respective drum or turntable on the marine vessel.

In a step a) of the method, the first bottom DC submarine power cable 3*a*, the second bottom DC submarine power cable 3*b*, and a top DC submarine power cable 3*c* are provided.

During cable laying, the first and second bottom DC submarine power cable 3*a* and 3*b* are fed from a respective drum or turntable and arranged parallel with each other.

In a step b) the first bottom DC submarine power cable 3*a* is bundled with the second bottom DC submarine power cable 3*b* by means of the first elongated bundling element 7. The first bundle 9 is thus formed.

In a step c) the first bundle 9 is bundled with the top DC submarine power cable 3*c* by means of the second elongated bundling element 11 such that the submarine power cable bundle 1 thus formed obtains a trefoil configuration.

The bundling in step b) is made tighter than the bundling in step c). The top DC submarine power cable 3*c* is able to slide relative to the first bundle 9, thus ensuring that the mismatch in cable length when being bent over the vessel chute is compensated by the opposite mismatch in length at the bend at the touchdown point.

In a step d) the submarine power cable bundle 1 is laid on the seabed from the marine vessel. Steps b) and c) may be performed continuously at a bundling station on the marine vessel as more length of the DC submarine power cables 3*a*-3*c* is fed from the drums/turntables, while the already bundled DC submarine power cables 3*a*-3*c* are lowered into the water.

The feed-out speed of the three DC submarine power cables 3*a*-3*c* from the marine vessel is controlled by means of tensioners. The tensioners are arranged on the vessel. The feed-out speed may be controlled to be the same for each of the three DC submarine power cables 3*a*-3*c* during steps b)-d). By feeding the top DC submarine power cable 3*c* with the same speed as the two bottom DC submarine power cables 3*a*-3*b*, additional tension can be introduced in the top DC submarine power cable 3*c* that allows the top DC submarine power cable 3*c* to slide axially in relation to the two bottom DC submarine power cables 3*a*-3*b*, from the touch down point on the seabed to the vessel chute.

The inventive concept has mainly been described above with reference to a few examples. However, as is readily appreciated by a person skilled in the art, other embodiments than the ones disclosed above are equally possible within the scope of the inventive concept, as defined by the appended claims.

The invention claimed is:

1. A submarine power cable bundle comprising:
   a first bottom direct current, DC, submarine power cable,
   a second bottom DC submarine power cable, and
   a top DC submarine power cable,
   wherein the first bottom DC submarine power cable and the second bottom DC submarine power cable are bundled together by means of a first elongated bundling element, forming a first bundle,
   wherein the first bundle is bundled together with the top DC submarine power cable by means of a second elongated bundling element, forming a trefoil configuration,
   wherein the first elongated bundling element bundles the first bundle tighter than the second elongated bundling element bundles the first bundle and the top DC submarine power cable.

2. The submarine power cable bundle as claimed in claim 1, wherein the first bundle is bundled with a tightness that prevents the top DC submarine power cable to fully slide in between and align with the first bottom DC submarine power cable and the second bottom DC submarine power cable, and wherein the second elongated bundling element bundles the first bundle and the top DC submarine power cable with a tightness that enables axial movement of the top DC submarine power cable relative to the first bundle when the submarine power cable bundle is laid on the seabed via a vessel chute.

3. The submarine power cable bundle as claimed in claim 1, wherein the first elongated bundling element bundles the first bottom DC submarine power cable and the second bottom DC submarine power cable along a majority of the length of the first bottom DC submarine power cable and the second bottom DC submarine power cable.

4. The submarine power cable bundle as claimed in claim 1, wherein the second elongated bundling element bundles the first bundle and the top DC submarine power cable along a majority of the length of the first bottom DC submarine power cable, the second bottom DC submarine power cable, and the top DC submarine power cable.

5. The submarine power cable bundle as claimed in claim 1, wherein the trefoil configuration has an outer bundle circumference which is defined by a length of the second elongated bundling element as it extends one turn around the first bundle and the top DC submarine power cable, seen in a cross-sectional view along a longitudinal axis of the submarine power cable bundle, wherein a first lay length of the first elongated bundling element is at most 3 times the outer bundle circumference, such as at most 2.5 times the outer bundle circumference.

6. The submarine power cable bundle as claimed in claim 5, wherein a second lay length of the second elongated bundling element is at most 9 times the outer bundle circumference, such as at most 3.75 times the outer bundle circumference.

7. The submarine power cable bundle as claimed in claim 1, wherein the first elongated bundling element has a tensile stiffness of at most 15 kN, 12 kN, or 10 kN.

8. The submarine power cable bundle as claimed in claim 7, wherein the trefoil configuration has an outer bundle circumference which is defined by a length of the second elongated bundling element as it extends one turn around the first bundle and the top DC submarine power cable, seen in a cross-sectional view along a longitudinal axis of the submarine power cable bundle, wherein a first lay length of the first elongated bundling element is at most 3 times the outer bundle circumference, such as at most 2.5 times the outer bundle circumference,
wherein a ratio between the number N of first elongated bundling elements used times the tensile stiffness of a first elongated bundling element and the first lay length is at least 4 kN/m.

9. The submarine power cable bundle as claimed in claim 1, wherein the second elongated bundling element has a tensile stiffness of at most 15 kN, 12 kN, or 10 kN.

10. The submarine power cable bundle as claimed in claim 9, wherein a second lay length of the second elongated bundling element is at most 9 times the outer bundle circumference, such as at most 3.75 times the outer bundle circumference,
wherein a ratio between a number M of second elongated bundling elements used times the tensile stiffness of a second elongated bundling element and the second lay length is at least 2 kN/m and at most 10 KN/m.

11. The submarine power cable bundle as claimed in claim 1, wherein the first elongated bundling element is arranged in an 8-shaped formation as it bundles the first bottom DC submarine power cable and the second bottom DC submarine power cable.

12. The submarine power cable bundle as claimed in claim 1, comprising a submarine fibre optic cable, wherein the submarine fibre optic cable is bundled with the first bundle by means of the second elongated bundling element or forms part of the first bundle.

13. The submarine power cable bundle as claimed in claim 1, wherein the first elongated bundling element is a rope or yarn and wherein the second elongated bundling element is a rope or yarn.

14. The submarine power cable bundle as claimed in claim 1, wherein the first elongated bundling element is laid with a first lay direction and the second elongated bundling element is laid with a second lay direction, opposite to the first lay direction.

15. A method of laying DC submarine power cables from a marine vessel, the method comprising:
   a) providing a first bottom DC submarine power cable, a second bottom DC submarine power cable, and a top DC submarine power cable,
   b) bunding the first bottom DC submarine power cable with the second bottom DC submarine power cable by means of a first elongated bundling element, to form a first bundle,
   c) bundling the first bundle with the top DC submarine power cable by means of a second elongated bundling element, to form a submarine power cable bundle with a trefoil configuration,
   wherein the bundling in step b) is made tighter than the bundling in step c), and d) laying the submarine power cable bundle on the seabed.

16. The submarine power cable bundle as claimed in claim 2, wherein the first elongated bundling element bundles the first bottom DC submarine power cable and the second bottom DC submarine power cable along a majority of the length of the first bottom DC submarine power cable and the second bottom DC submarine power cable.

17. The submarine power cable bundle as claimed in claim 2, wherein the second elongated bundling element bundles the first bundle and the top DC submarine power cable along a majority of the length of the first bottom DC submarine power cable, the second bottom DC submarine power cable, and the top DC submarine power cable.

18. The submarine power cable bundle as claimed in claim 2, wherein the trefoil configuration has an outer bundle circumference which is defined by a length of the second elongated bundling element as it extends one turn around the first bundle and the top DC submarine power cable, seen in a cross-sectional view along a longitudinal axis of the submarine power cable bundle, wherein a first lay length of the first elongated bundling element is at most 3 times the outer bundle circumference, such as at most 2.5 times the outer bundle circumference.

19. The submarine power cable bundle as claimed in claim 2, wherein the first elongated bundling element has a tensile stiffness of at most 15 kN, 12 kN, or 10 kN.

20. The submarine power cable bundle as claimed in claim 2, wherein the second elongated bundling element has a tensile stiffness of at most 15 kN, 12 kN, or 10 kN.

* * * * *